United States Patent

Winfield

[15] 3,636,510
[45] Jan. 18, 1972

[54] PUSHBUTTON LIQUID LEVEL CHECKING APPARATUS FOR VEHICLES

[72] Inventor: Dewey E. Winfield, 2532 West Wethersfield Road, Phoenix, Ariz. 85029

[22] Filed: Feb. 11, 1971

[21] Appl. No.: 114,562

[52] U.S. Cl. ................................................340/59, 340/244
[51] Int. Cl. .............................................................B60q 1/00
[58] Field of Search ...............340/59, 244, 245, 246; 73/290

[56] References Cited

UNITED STATES PATENTS

| | | | |
|---|---|---|---|
| 2,539,604 | 1/1951 | Woolley | 340/59 X |
| 2,588,761 | 3/1952 | Raby | 340/59 |
| 2,717,991 | 9/1955 | Sherman | 340/59 X |
| 3,132,331 | 5/1964 | Boddy | 340/59 X |

*Primary Examiner*—Alvin H. Waring
*Attorney*—Drummond & Phillips

[57] ABSTRACT

In order to provide means for remotely checking for a minimum acceptable liquid level, such as the oil level in an engine crankcase or automobile transmission, one end of a conduit is fixed such that it opens below the minimum acceptable liquid level while the other end of the conduit is coupled to apparatus which, when activated, sets up a suction within the conduit which will be released immediately if the liquid level is too low and will be controllably released if the liquid level exceeds the minimum according to whether the open end of the conduit is above or below the liquid level. The apparatus coupled to the conduit includes a cylindrical housing containing a pliable bulb, a Bellofram or the like, disposed adjacent a pushbutton assembly which, when depressed, forces air out of the bulb and the conduit. When the pushbutton is released, the suction set up in the conduit will either be controllably released through a perforated diaphragm or immediately released at the remote end of the tubing according to whether the liquid being checked is above or below the remote end. The diaphragm also functions as a contact element in an electrical circuit including an indicator lamp and remains closed to light the lamp while the suction is being controllably released through its aperture indicating a safe liquid level. The lamp will not light if the suction is immediately released because of an unsafe liquid level. Switch means are provided such that the signal lamp can be temporarily utilized as an auxiliary lamp at the option of the operator.

6 Claims, 4 Drawing Figures

INVENTOR
DEWEY E. WINFIELD

BY

ATTORNEYS

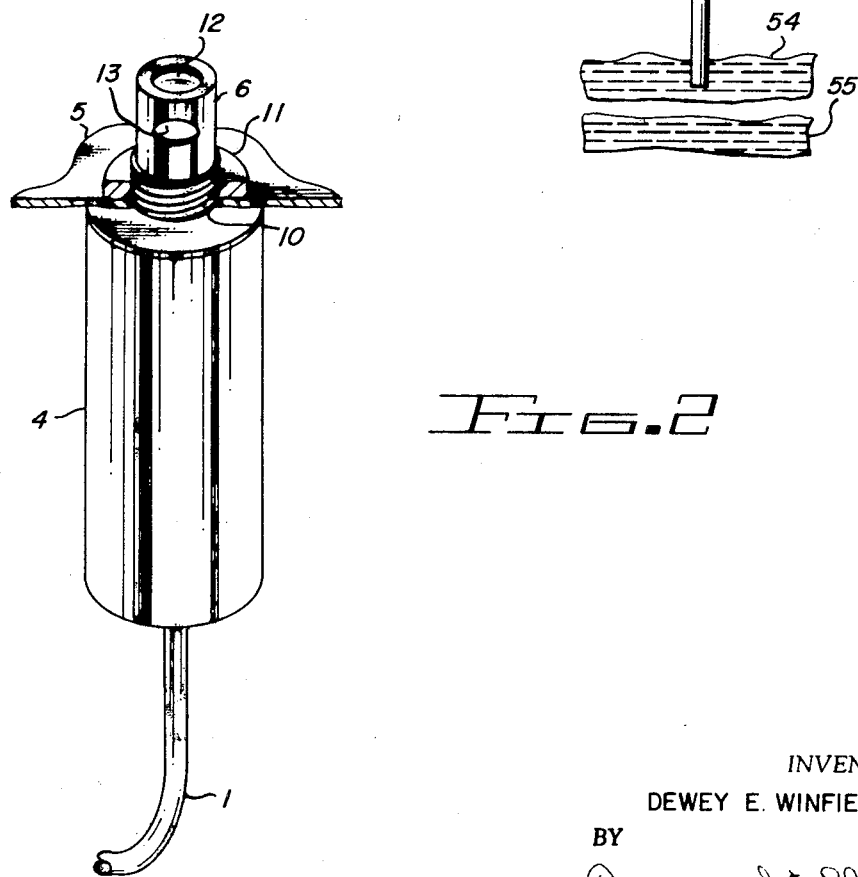

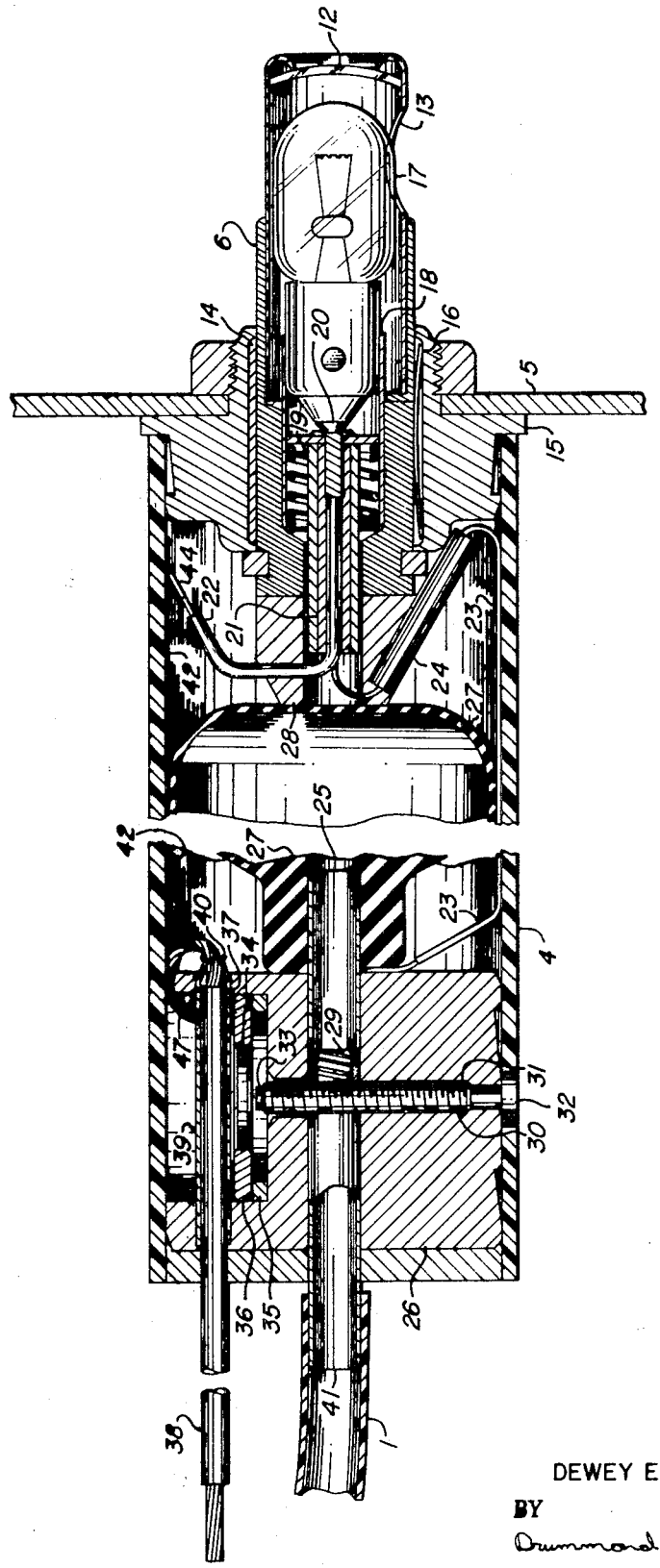

PUSHBUTTON LIQUID LEVEL CHECKING APPARATUS FOR VEHICLES

This invention relates to liquid level detectors and, more particularly, to apparatus for checking for a minimum acceptable liquid level through a remote determination as to whether or not the open end of a conduit is above or below the liquid level.

The necessity for maintaining minimum oil level in an engine crankcase to insure proper lubrication of the moving parts of an engine is notoriously well known. Maintaining a minimum level of transmission oil is perhaps even more critical, particularly in the case of automatic transmissions which can suffer devastating damage if driven for any distance with a low fluid level. Traditionally, both crankcase oil levels and automatic transmission fluid levels have been checked utilizing a dip stick calibrated at its lower end to indicate a safe range for the oil level. In practice, the crankcase oil level and, particularly, the automatic transmission fluid level is seldom checked at proper intervals because of the unpleasant nature of the task, and, further, because many drivers simply do not know how to perform the task properly. Additionally, for fleet operation carried out by bus lines, trucking companies and the like, in which these critical oil levels are checked on a somewhat routine basis, the cost in labor and time becomes very substantial. Thus, it will be apparent that it would be highly desirable to provide means for quickly and accurately checking these critical oil levels from the driver's seat.

It is therefore, a broad object of my invention to provide means for giving a remote indication as to whether or not a liquid level is beneath a predetermined minimum acceptable level.

It is a more specific object of my invention to provide such apparatus which includes a conduit with an open end disposed at the predetermined minimum acceptable level and means for temporarily depressing the pressure within the conduit and indicating whether the pressure is held by the liquid at the conduit open end.

It is further object of my invention to provide means responsive to the holding of the depressed pressure within the conduit to controllably release the suction and give a positive indication by lighting a signal lamp.

Yet another object of my invention is to provide means for selectively utilizing the signal lamp as an auxiliary lamp.

The subject matter of the invention is particularly pointed out and distinctly claimed in the concluding portion of the specification. The invention, however, both as to organization and method of operation, may best be understood by reference to the following description taken in connection with the accompanying drawing of which:

FIG. 2 illustrates the external configuration of the housing containing the mechanical and electrical components;

FIG. 3 is a cross-sectional view taken along the line 3—3 of FIG. 2; and

FIG. 4 is a partially cut away view illustrating a modification of the mechanism for applying suction to interrogate the liquid level and also illustrates a specific construction for the remote end of the conduit.

Figure 1:
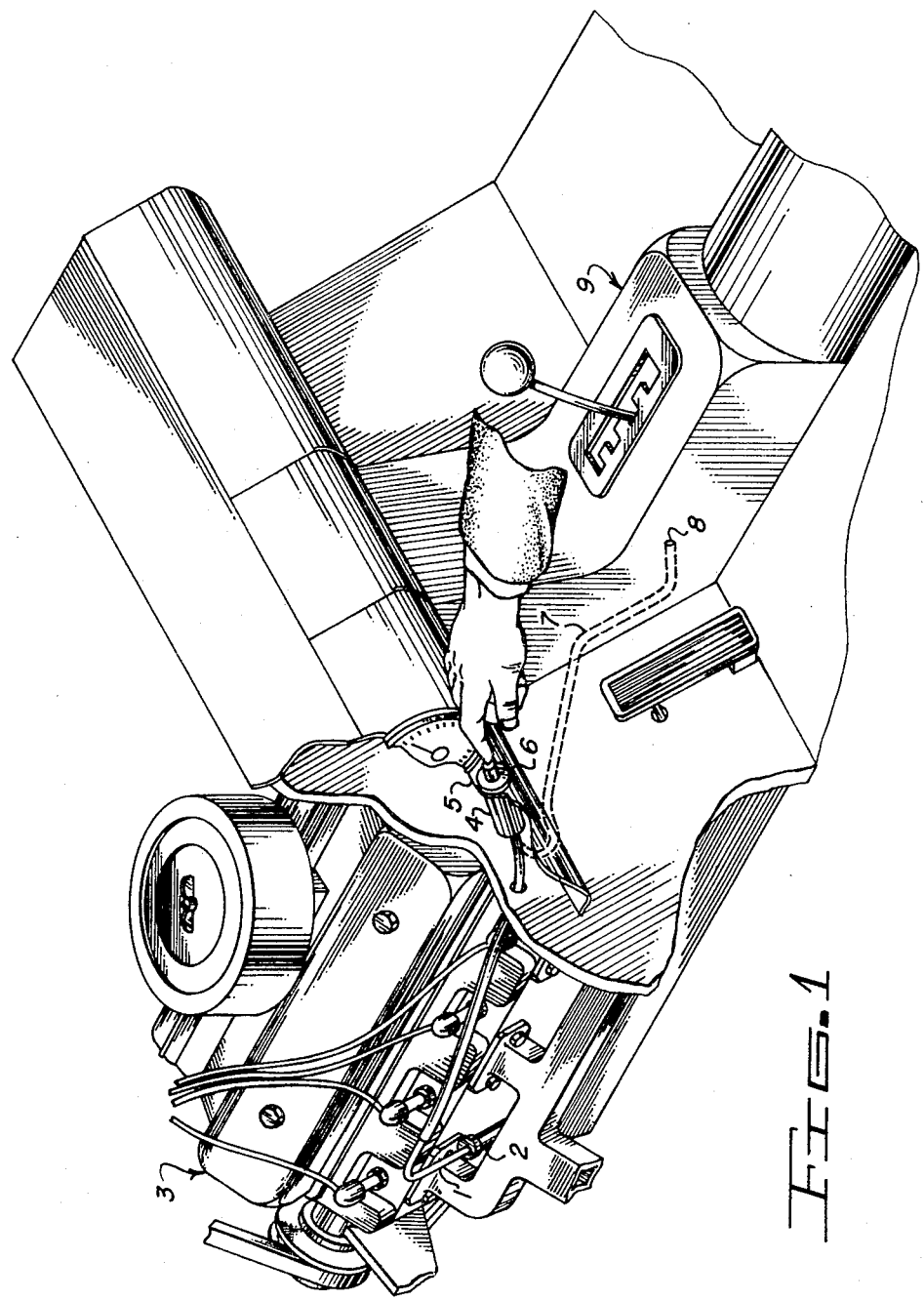
FIG. 1 is a perspective view illustrating an exemplary installation of the invention in a motor vehicle.

Referring now to FIG. 1, which illustrates an exemplary installation for the present invention, it will be observed that a remote end of a conduit 1 has been inserted into the dipstick receptacle 2 of an automobile engine 3. The other end of the conduit 1 is coupled to the back of a housing 4 which is secured to a dashboard 5 in such a manner that a pushbutton 6 extends through the dashboard in a position at which it can be easily depressed by the vehicle operator. Alternatively, a conduit 7, shown in phantom in FIG. 1, is coupled between the housing 4 and the dipstick receptacle 8 of an automatic transmission 9. It will be understood that the housing 4 and the apparatus contained therein can be duplicated to provide means for checking both the crankcase oil level and the transmission fluid level or that a switch valve can be utilized to selectively couple either the conduit 1 or the conduit 7 to the single housing 4. In order to avoid unduly complicating the drawings and the description, principal attention will be directed to an exemplary embodiment for checking the crankcase oil level.

FIG. 2 illustrates the manner in which the housing 4 is secured to the dashboard 5 with the pushbutton assembly 6 extending outwardly. A longitudinally extending threaded portion 10 passes through a precut opening in the dashboard 5 and receives a nut 11 which, when tightened, pulls the housing 4 snugly against the inner surface of the dashboard 5. As will be explained in further detail below, the pushbutton 6 contains a signal lamp and includes a translucent area 12 for monitoring the lamp. Additionally, downwardly directed opening 13 is provided in the pushbutton 6 for reasons which will become more apparent as the description proceeds.

FIG. 3 discloses the details of the electrical and mechanical structure within the housing 4. The pushbutton 6 is coaxially, slidably mounted within the housing 4 by means of a tape bearing 14 which, in practice, consists of metallic particle impregnated Teflon to provide a conductive path between the pushbutton assembly 6 and a front body member 15 which may be a conductive material. Since the front body member 15 is in direct contact with the dashboard 5, it will be apparent to those skilled in the art that a ground connection is made thereby. In order to assure a good conductive path between the pushbutton assembly 6 and the front body member 15, a metallic spring strip 16 functions as a sliding contact as the pushbutton assembly 6 translates within the housing 4. A lamp 17 is fixed within the pushbutton assembly 6 by means of a lamp socket 18 whose outer shell is in direct contact with the pushbutton assembly 6 and hence with ground potential in the vehicle electrical system. The lamp 17 has the common bayonet type base, and the socket 18 is configured accordingly and is provided with a spring 19 to hold the lamp 17 in place in the usual fashion. The positive contact 20 of the lamp 17 bears against and is in electrical communication with the eyelet contact 21 to which the wiper contact 22 and a signal lead 23 are fixed. A plastic sleeve 24 is utilized to dress the signal lead 23 against the inner wall of the housing 4. The signal lead 23 is stripped of insulation along a length of its rearward end, and the bare wire is wrapped about or otherwise conductively secured to a metallic tube 25 which protrudes coaxially and longitudinally from a generally cylindrical rear closure member 26 which consists of an insulating material such as polyvinylchloride. A flexible bulb 27 fits very closely and substantially airtight over the metallic tube 25 and abuts the rear closure member 26 to provide additional mechanical integrity to the connection between the signal lead 23 and the metallic tube 25. The large end of the flexible bulb 27 rests against the rearward end 28 of the pushbutton assembly 6 such that depressing the pushbutton 6 decreases the volume within the flexible bulb 27 to force air outwardly through the metallic tube 25. Contact spring 29 is inserted between the metallic tube 25 and an adjusting screw 30 to insure a good electrical contact. The adjusting screw 30 extends from a lower end 31, which may be accessed by an Allen Head wrench through a port 32 through the housing 4 and the rear closure member 26, to an upper end 33 which serves as an electrical contact. A metallic diaphragm 34 is fixed in a position normally closely separated from the end 33 of the adjusting screw 30 by means of an O-ring seal 35, a flat washer 36 and a retaining ring 37. As will be discussed below, the metallic diaphragm 34 serves as a complementary contact to the end 33 of the adjusting screw.

A hot wire 38, connected to any convenient point in the vehicle electrical system, passes longitudinally through a metallic tube 39 and is stripped at its inner end in order that the end 40 of the metallic tube 39 may be crimped to make a good electrical connection. Thus, the metallic diaphragm 34 is in direct electrical communication with the hot side of the vehicle electrical system through the wire 38, the metallic tube 39, the retaining ring 37, and the washer 36.

Another metallic tube 41 protrudes rearwardly from the rear closure member 26 in longitudinal alignment with the metallic tube 25. It will be observed that sufficient clearance is provided about the upper portion of the adjusting screw 30 to place the interior of the bulb 27, the passage through the metallic tube, the space beneath the metallic diaphragm 34, and the passage through the metallic tube 40 all in direct communication. The lower portion of the adjusting screw 30 is tightly threaded in the rear closure member 26 to provide a seal. A conduit 1, which may be vinyl tubing, is fitted snugly over the protruding portion of the metallic tube 41.

A narrow conductive strip 42 extends longitudinally along the inner wall of the housing 4 between a contact point 43 with the end of the wire 38 and a portion in circumferential alignment with the bare end 44 of the wiper contact 22. The conductive strip 42 is disposed such that manual rotation of the pushbutton assembly 6 brings the wiper contact end 44 into contact with the conductive strip 42 to energize the lamp 17 whereby it performs its auxiliary lamp function. A pair of fixed stops 50 constrain the circumferential travel of the sleeve 24 to accordingly limit the circumferential travel of the wiper contact end 44 to that necessary to achieve the the make and break function for auxiliary or normal operation. It will be understood that this electrical connection is not made when the liquid level test is carried out by depressing the pushbutton assembly.

FIG. 4 illustrates another practical embodiment of the invention in which the flexible bulb 27 of FIG. 3 is replaced by a Bellofram 45. The rear of the pushbutton assembly 6 carries a support plate 46 which includes a rearwardly extending spring retainer portion 47 for containing a compression spring 48. In this configuration, the signal lead 49 passes through the interior of the Bellofram 5 and is fixed directly to the adjusting screw 30.

FIG. 4 also illustrates an exemplary configuration for the sensing end of the conduit 1. An aluminum tube 51 is measured against the dipstick such that the lower end extends into the crankcase or transmission case to a distance corresponding to the "add" mark on the dipstick. A steel cup 52 is then secured to the aluminum tube 51 by means of a push-on retainer 53 and the upper end of the aluminum tube is bent in an appropriate fashion to guide the vinyl conduit 1 away from any adjacent apparatus which might be at an elevated temperature.

To carry out the liquid level check, the pushbutton assembly 6 is depressed to partially collapse the pliable bulb 27 or Bellofram 45 which forces air through the conduit 1 and out the lower opening of the aluminum tube 51. Assuming that the liquid level 54 is above the lower opening of the aluminum tube 51, a suction will be set up in the conduit 1 which is communicated, as previously indicated, to the space below the metallic diaphragm 34. Inasmuch as space above the diaphragm 34 remains at atmospheric pressure, the diaphragm is pulled downwardly by the suction to contact the upper end 33 of the adjusting screw 30 thereby energizing the lamp 17 indicating a safe liquid level. The diaphragm 34 is provided with a small aperture to permit the partial vacuum in the system to return to atmospheric within a few seconds thereby allowing the bulb 27 or Bellofram 45 to expand outwardly expanding the pushbutton assembly 6 and breaking the contact with the adjusting screw 30. It has been found in practice that a single aperture in the diaphragm 34 0.003 inch in diameter permits reliable operation utilizing conduit runs of up to approximately 5 feet. If a longer run is necessary for a specific installation, a slightly smaller aperture is indicated.

However, if the liquid level 54 should be below the lower opening of the aluminum tube 51 when the pushbutton assembly 6 is depressed, the suction will not be held in the conduit 1 because the lower opening of the aluminum tube 51 is in direct communication with atmospheric under this condition. As a result, the diaphragm 34 will not be pulled downwardly to contact the upper end 33 of the adjusting screw 30, and the lamp 17 will not light. An unsafe condition is further indicated by the fact that the immediate expanse of the bulb 21 or the Bellofram 45 to the fully extended position urges the pushbutton assembly 6 outwardly, a condition that can be easily sensed manually by the operator.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. Apparatus for remotely checking for a minimum acceptable liquid level comprising:
   A. a conduit with first and second ends;
   B. means for fixing said first end of said conduit in position such that it opens at the minimum acceptable liquid level;
   C. a DC power source;
   D. interrogation apparatus coupled to said second end of said conduit, said interrogation apparatus including a housing, and:
      1. means for manually depressing the pressure in said conduit below atmospheric;
      2. a signal lamp; and
      3. pressure-responsive switch means having first and second sides, said switch means also having normally open contacts coupled in series connection with said signal lamp across said DC power source, said first side of said pressure responsive switch means being exposed to atmospheric pressure, said second side of said pressure responsive switch being in communication with said conduit such that said contacts close when the pressure within said conduit is depressed below atmospheric thereby energizing said lamp from said DC power source.

2. The apparatus of claim 1 in which said means for manually depressing the pressure in said conduit comprises:
   A. a pliable airtight container in fluid communication with said conduit, means included with said pliable container urging it to a normal shape; and
   B. a pushbutton assembly bearing on said pliable container such that actuation of said pushbutton assembly distorts said pliable container to decrease the volume thereof.

3. The apparatus of claim 2 in which said pressure-responsive switch means includes a metallic diaphragm having a circumference and an inner portion, said diaphragm being electrically coupled to said DC power source, said normally open contacts comprising said diaphragm and a normally stationary contact member disposed generally perpendicular to said diaphragm and normally spaced therefrom, said circumference of said diaphragm being fixed with respect to said contact member, said inner portion of said diaphragm being deflectable toward said contact member a sufficient distance to make electrical contact therewith when the pressure in said conduit is depressed below atmospheric thereby energizing said lamp from said DC power source.

4. The apparatus of claim 3 in which said diaphragm is provided with an aperture to permit the pressure in said conduit and said pliable container to return to atmospheric at a controlled rate after said pushbutton assembly has been actuated.

5. The apparatus of claim 4 in which said signal lamp is disposed within said pushbutton assembly.

6. The apparatus of claim 5 which includes:
   A. a contact strip disposed longitudinally along an inner wall of said housing, said contact strip being electrically connected to said diaphragm;
   B. a wiper contact electrically coupled to said wiper contact fixed to said pushbutton assembly and normally bearing against said inner wall at a position circumferentially removed from said contact strip; and
   C. means mounting said pushbutton assembly to said housing for a range of rotation with respect thereto, said range being sufficient to bring said wiper contact onto said contact strip at one extreme thereof to energize said lamp.